United States Patent [19]

Lloyd

[11] 4,180,042

[45] Dec. 25, 1979

[54] FUEL-AIR MIXTURE REGULATOR FOR INTERNAL COMBUSTION ENGINES

[76] Inventor: David J. Lloyd, P.O. Box 1016, Blythe, Calif. 92225

[21] Appl. No.: 903,881

[22] Filed: May 8, 1978

[51] Int. Cl.$^2$ ............................................. F02M 29/00
[52] U.S. Cl. .................................. 123/141; 48/180 R; 48/180 M; 137/512.1; 137/856
[58] Field of Search ............... 123/141, 103 B, 103 D, 123/52 MF, 73 A; 261/62, DIG. 6; 48/180 M, 180 R

[56] References Cited

U.S. PATENT DOCUMENTS

| | | | |
|---|---|---|---|
| 993,516 | 5/1911 | Gentle | 261/DIG. 6 |
| 1,594,094 | 7/1926 | Ernst | 261/62 |
| 1,632,198 | 6/1927 | Ritter | 261/62 |
| 2,027,480 | 1/1936 | Higley | 123/141 |
| 2,251,999 | 8/1941 | Greco | 123/141 |
| 3,077,391 | 2/1963 | Guffra | 48/180 |
| 3,687,118 | 8/1972 | Nomura | 123/73 R |
| 3,690,304 | 9/1972 | Schneider | 123/73 A |
| 3,707,278 | 12/1972 | Landrum | 261/62 |
| 3,752,129 | 8/1973 | Kobayashi | 123/73 A |
| 4,123,233 | 10/1978 | Mannino | 48/180 M |

FOREIGN PATENT DOCUMENTS 421011  3/1947  Italy ..................................... 123/52 M

OTHER PUBLICATIONS

True Magazine, 3/1974, Gas Shortage Article, by Keith Engh.

Primary Examiner—Ronald H. Lazarus
Attorney, Agent, or Firm—Fishburn, Gold & Litman

[57] ABSTRACT

A fuel-air mixture regulator for multiple cylinder four-cycle internal combustion engines is positioned between the carburetor and the intake manifold whereby the fuel and air mixture flowing from the carburetor passes through the fuel-air mixture regulator and undergoes an increase in velocity and turbulence enroute to the cylinders for better combustion. The mixture regulator includes a housing having a plurality ports. A thin, resilient, flexible reed for each port is adapted to seat thereover when the engine is not operating and moves away from the port to variably open same for flow of fuel-air mixture therethrough in response to pressure differentials on the reeds during engine operation. The size of the port opening is reduced at lower engine speeds and assures optimum fuel-air mixing and high velocity air flow even at such lower speed.

7 Claims, 6 Drawing Figures

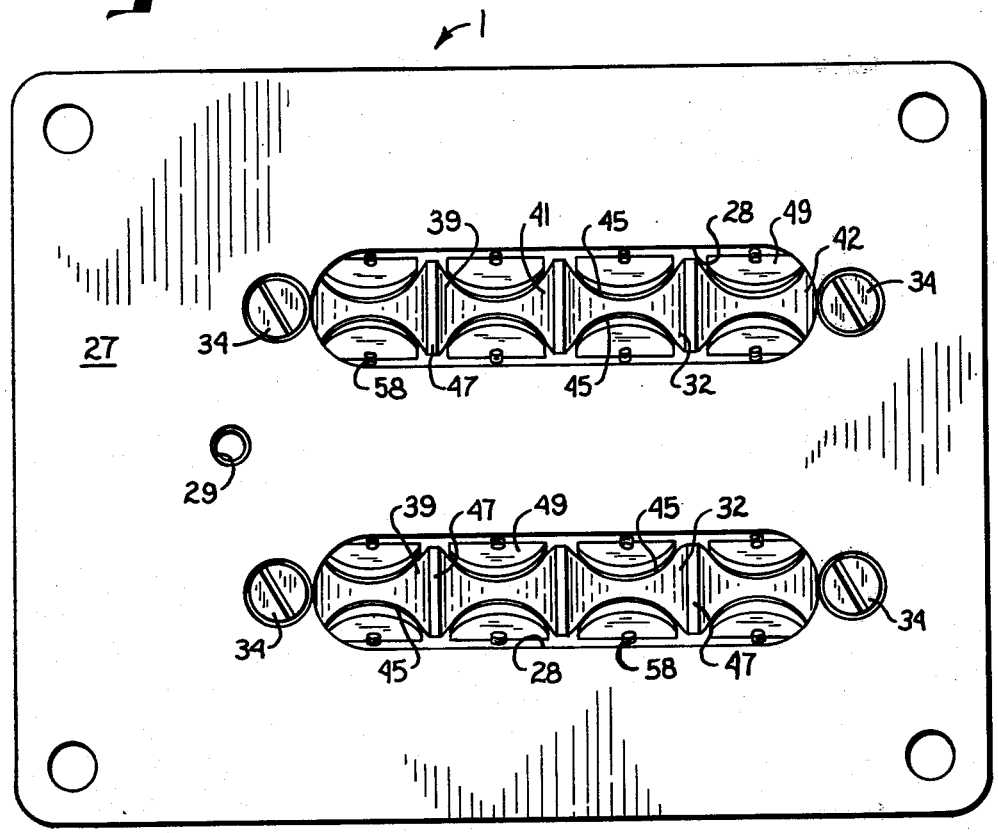

FUEL-AIR MIXTURE REGULATOR FOR INTERNAL COMBUSTION ENGINES

BACKGROUND OF THE INVENTION

Many devices have been developed for improving the mixing of fuel and air and increasing the efficiency of a four-cycle multiple cylinder internal combustion engine. Such devices typically include shaped passages within the intake manifold and various atomizing devices and the like which are specifically adapted to be interposed between a carburetor base and the intake manifold of such an engine to increase the turbulence of the fuel-air mixture flowing therethrough. Typically, these atomizing devices are relatively easily connected to an existing engine system by simply unbolting the carburetor and fitting the device onto the top of the intake manifold.

A recurring problem encountered in efforts to improve the operation of the multiple cylinder four-cycle internal combustion engine is the nonuniform distribution of fuel and air to the respective cylinders of the engine. Many intake manifolds, and particularly those used on relatively elongated engines, such as an inline six cylinder engine having a single carburetor, have intake manifolds which are curved particularly in the passages that lead to the cylinders most remote from the carburetor. As fuel-air mixture flows through the remote cylinder passages and around the curves of the manifold, separation of the fuel from the air may result whereby certain of the cylinders will run relatively rich, that is; having a high quantity of fuel relative to air, and certain of the cylinders will run relatively lean, that is; having a relatively high quantity of air to fuel.

Normally, these engines are tuned to obtain proper operating conditions in the lean cylinders to prevent knocking or predetonation by adjusting the mixture needle valve of the carburetor so that the cylinders which would be lean without further adjustment are correct and thereby creating even richer conditions in the remaining cylinders. Accordingly, these rich running cylinders excessively consume fuel, have incomplete combustion with attendant emission of certain pollutants and cause the build-up of carbon in those cylinders which can result in burned valves and the like.

Moreover, another inherent problem in the operation of four-cycle multicylinder internal combustion engines lies in the pulses of the intake manifold. Whereby the fuel-air mixture reciprocates somewhat within the carburetor mixing chamber, particularly at low engine speeds, resulting in the addition of extra fuel to the fuel-air mixture. Commonly, restrictions are placed between the cylinders and the carburetor to reduce blow back but typically these only marginally perform because to eliminate blow back using these prior art restrictions, excessive restriction of the intake manifold would be required and would result in poor engine performance.

In view of the above, the principal objects of the present invention are: to provide a fuel-air mixture regulator for improving the operating and performance characteristics of a multiple cylinder four-cycle internal combustion engine by reducing the effects of the above mentioned defficiencies; to provide such a regulator wherein a port opening varies in response to differential pressure on a reed or valve member overlying same to improve the mixing of fuel and air supplied to the engine cylinders; to provide such a regulator having a variable port to increase turbulence and improve the atomization and vaporization of fuel in the air and thereby result in more efficient operation of the engine; to provide such a regulator which does not excessively restrict the intake manifold of the engine so as to decrease the performance characteristics thereof; to provide such a regulator which will increase the velocity and turbulence of the fuel-air mixture to improve the operating efficiency of the engine and decrease the rate of fuel consumption; to provide such a regulator which will result in a more complete burning of the combustion mixture and thereby reduce emission of certain pollutants; to provide such a regulator which will increase and tend to maintain the uniformity of the fuel-air mixture distributed to each of the cylinders of the engine and provide smooth and efficient operation; to provide such a regulator which can be easily installed on existing conventional multicylinder four-cycle internal combustion engines without substantial alterations to existing engine structure; and to provide such a regulator which is economical to manufacture, has a minimum number of parts, is positive in operation and easy to maintain and that is particularly well adapted for its intended use.

Other objects and advantages of the present invention will become apparent from the following description taken in connection with the accompanying drawings wherein are set forth by way of illustration and example certain embodiments of this invention.

FIG. 4 is a plan view of the regulator.

FIG. 5 is a side view of the regulator and having sections broken away to show structural details thereof.

FIG. 6 is an end view of the regulator and having reeds thereof in closed position.

Figure 1:
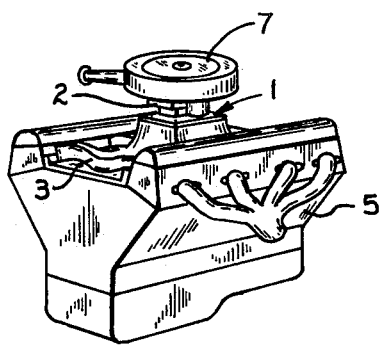
FIG. 1 is perspective view of a four-cycle multicylinder internal combustion engine of the type known as a V-8 engine and having a fuel-air mixture regulator embodying this invention mounted between the carburetor and intake manifold thereof.

Referring more in detail to the drawings:

As required detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

The reference numeral 1 designates generally a fuel-air mixture regulator embodying the present invention and which is interposed between a carburetor 2 and an intake manifold 3 which may be integral with an engine head or in a conventional separate form with a multiple cylinder four-cycle internal combustion engine such as the illustrated V-8 engine 5. The carburetor 2 is of a conventional type and can have either single or multiple barrels of the downdraft type, as illustrated, or of the sidedraft type (not shown).

Figure 2:
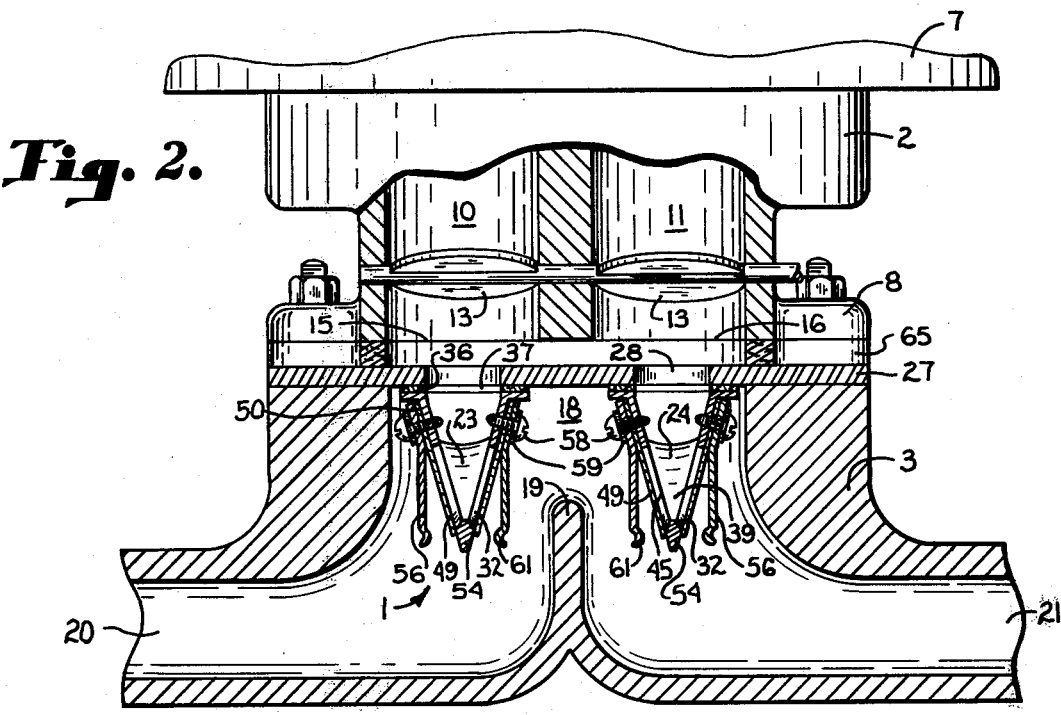
FIG. 2 is an elevational sectional view of the regulator mounted between the carburetor and intake manifold and having reeds thereof closed as when the engine is stopped.
Figure 3:
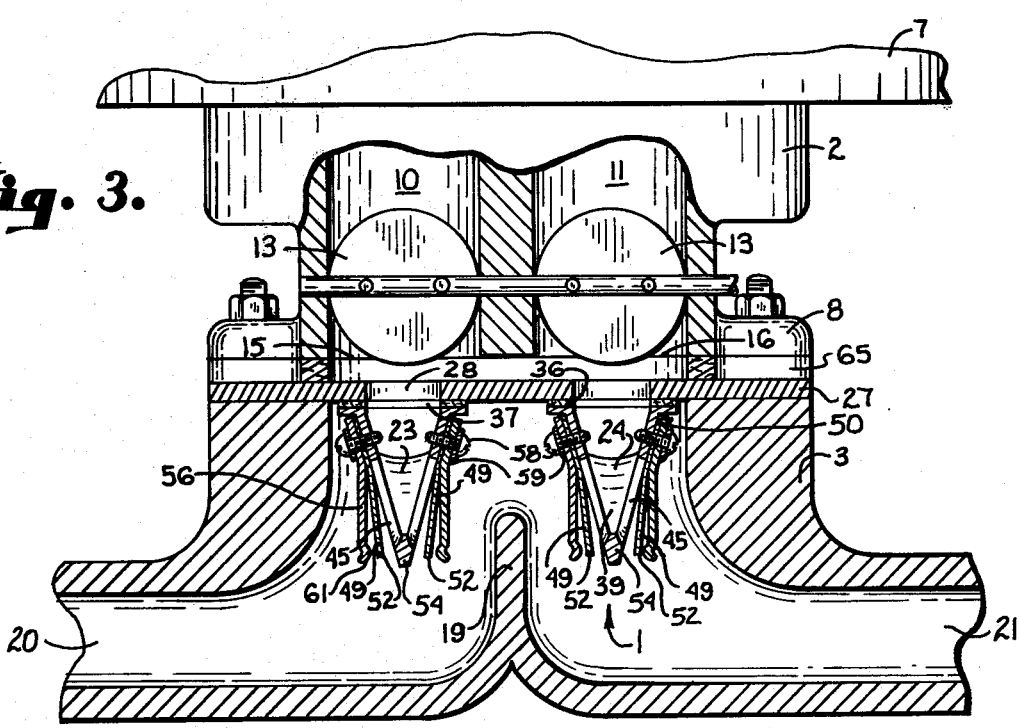
FIG. 3 is an elevational sectional view of the attachment as in FIG. 2 and showing the reeds in an open position as when the engine is operating.

As illustrated in FIGS. 2 and 3, the fuel-air mixture regulator is mounted between a carburetor 2 having a conventional air cleaner 7 and a flanged base 8 providing portions for attachment to the intake manifold 3. The carburetor 2 has a pair of mixing and discharging passages or barrels 10 and 11 with butterfly valves 13 extending transversely thereacross and operative to regulate the amount of fuel and air flowing therethrough and thereby control the speed of the properly tuned engine. The respective ends or outlets 15 and 16 of the barrels 10 and 11 communicate with an intake passage 18 of the intake manifold 3 having a central wall 19 separating the mixture flow toward respective flow passages, such as passages 20 and 21 directing the fuel-air mixture to the respective cylinders served thereby. As is conventional, the respective cylinders include intake and exhaust poppet valves (not shown) controlled by means such as cam shafts and timing chains.

The fuel-air mixture regulator 1 is provided with means that form one or more mixture chambers 23 and 24 between the carburetor outlets 15 and 16 and the manifold intake passage 18. Pressure responsive means associated with the mixture chambers 23 and 24 open and close flow ports therein in response to a pressure differential or suction thereacross wherein a mixture of fuel and air can flow through same into the intake manifold 3.

The regulator 1 includes a support or plate member 27 which has one or more openings 28 therethrough. The number and size of the openings 28 is dependent upon the type of carburetor being used. A single barrel carburetor would preferably have one opening 28 and a two or four barrel carburetor would preferably have two openings 28. In the illustrated structure, the regulator 1 is particularly adapted for use with a four barrel carburetor wherein there are two openings 28 which are oblong in shape so as to adapt to the two pairs of side-by-side barrels of the typical four barrel carburetor configuration.

The plate 27 is generally planar and is interposed or mounted between the carburetor flanges 8 and the manifold inlet 3 and sealed around the periphery thereof by a suitable gasket to prevent leakage between the carburetor 2 and the intake manifold 3. The openings 28 communicate the carburetor barrel outlets 15 and 16 with the manifold intake passage 18 through the mixture chamber means. A through aperture 29, FIG. 4, communicates between the carburetor 2 and the intake manifold 3 for a purpose later described.

The flow passage or mixture chamber forming means of the illustrated structure includes a housing having opposed converging walls 32 secured to the plate member 27 and extended downwardly into the manifold intake passage 18. The housing walls 32 each may be one of several forms or shapes so long as they produce similar results in use. The housing walls 32 are secured to the plate member 27 in any suitable manner and as illustrated, countersunk fasteners, such as screws 34 extend through the plate member 27 and each threadably engage a threaded hole (not shown) in lugs or ears 35 on opposite ends of the housing walls 32. Preferably, suitable sealing means, such as a gasket 36, is interposed between each of the housing walls 32 and the plate member 27 wherein the gaskets 36 provide leak free engagement between same. Each of the gaskets 36 accordingly have openings 37, FIG. 2, therethrough in alignment with respective openings 28.

In the illustrated example, the housing walls 32 extend from the periphery of the openings 28 and converge to form mixture chambers 39 extending downwardly from the the openings 28. The housing walls 32 include side wall portions 41 and end wall portions 42, said side wall portions 41 converging toward one another within the manifold intake passage 18 and form a flow area of decreasing cross sectional dimension. The housing walls 32 are provided with at least one opening or port 45 and in the illustrated structure, each of the side wall portions 41 have one or more of the ports 45 extended therethrough and forming outlets for the mixture chambers 39. Preferably, renforcing ribs 47 extend between the side wall portions 41 and are integral therewith to increase the rigidity of the housing walls 32 and divide the mixture of fuel and air into separate streams to flow through the ports 45. For connection to the plate member 27, the lugs or ears 35 are integral with the housing walls 32 and extend from the respective end wall portions 42. The housing walls 32 are preferably made of a durable material which is impervious to the fuel-air mixture and is of such a construction that is adapted to be manufactured by a die casting process integrally forming the ears 35, wall portions 41 and 42 and the ribs 47.

The fuel-air mixture regulator 1 is provided with a pressure responsive regulatory means, as described above, which is operable to permit and regulate the flow of fuel and air through the mixture chambers 39 and into the manifold intake passage 18. Any suitable pressure responsive means is contemplated for use therewith and as illustrated, a plurality of flat spring valves or reeds 49 may be used to selectively move to close the ports 45. In the illustrated example, the reeds 49 are positioned adjacent to and overlying respective ports 45 and movable from a position closing same to a position wherein the port 45 is open or relatively unrestricted. The reeds 49 have one end 50 secured to a respective side wall portion 41 and are thereby positioned to overlie seat portions of the side wall portion exterior surfaces surrounding the respective ports. Preferably, the reeds 49 are formed of thin and flat resilient material, such as spring steel, and in the illustrated example, a single elongate reed 49 extends the length of each side wall portion 41. The reeds 49 include a free end 52 extending toward the convergence 54 of the housing walls 32 and thereby overlie the area of the ports 45 for completely covering same when the reeds 49 are in a closed position.

Means are provided to limit or stop the opening movement of the reeds 49 relative to the ports 45 and thereby control the area or opening through which the fuel-air mixture flows. Additionally, the stop means help prevent damage to the reeds 49 by limiting excessive opening movement. In the illustrated example, elongate stop members 56 are preferably secured to a respective side wall portion 41 and partially overlie the exterior surface thereof with the respective reed 49 interposed between the side wall portion 41 and the respective stop member 56. The stop members 56 are removably secured to the housing walls 32 by fasteners, such as screws 58, extended through apertures in the stop member 56 and through the reeds 52 and threadably engaged within threaded apertures through the respective side wall portions 41 whereby the stop members and reeds are secured by the same fasteners. A lock washer 59 is between the heads of the screws 58 and the stop member to prevent same from vibrating loose during operation of the engine.

The stop members 56 diverge from the side wall portions 41 and reeds 49 downwardly of the screws 58 whereby lower portions of the stop members 56 are suitably spaced from the side wall portions 41 so as to allow the reeds 49 to move to an open position away from the respective side wall portion 41 to open the port 45. Each of the stop members 56 have a protuberance or rib 61 adjacent the lower edge thereof which extend a slight distance in front of the stop member 56 toward the free end portion of the respective reed 49 for arresting movement thereof. For a purpose later described, each of the stop members 56 is provided with through slots 63, FIG. 5, positioned preferably between two adjacent reeds 49.

As described above, the fuel-air mixture regulator 1 is suitably mounted between the coordinating complimentary flange base 8 of the carburetor 2 and the intake manifold 3 wherein the housing walls 32 are positioned within the manifold intake passage 18 and the side wall portions 41 converge downstream thereinto. Accordingly, the elongate ports 45 and reeds 49 have the elongate or major length thereof extending in the direction of the side wall portions 41 or from the carburetor discharge outlets 15 and 16 toward the manifold intake passage 18. The free end 52 of the reeds 49 are positioned downstream of the secured end 50 and remote from the carburetor 2 wherein the free end 52 moves in response to the pressure differential on the reeds 49.

As described above, the fuel-air mixture regulator 1 can be used with any conventional type of carburetor and, as illustrated, is adapted for use with a four-barrel carburetor wherein the fuel-air mixture regulator 1 includes two housings 32 in side-by-side, spaced apart relation. A gasket or spacer 65 interposed between the plate member 27 and the carburetor flanged base 8 provides a seal to prevent leakage and provides additional spacing between the plate member 27 and the carburetor 2 to allow clearance for rotation of the butterfly valve 13. The gasket 65 also acts as a heat insulator between the intake manifold 3 and the carburetor 2 and prevents excessive heat transfer causing vapor lock within the carburetor 2.

The present invention is more fully understood by a description of it operation. In use, the fuel-air mixture from the carburetor 2 flowing into the intake manifold 3 must first flow through the ports 45 of the fuel-air mixture regulator 1. When the engine is not in operation the reeds 49 are resiliently urged to a closed position seated against the seat portions of the exterior surfaces of their respective side wall portions 41 and thereby closing the ports 45. Starting the engine creates a suction by the action of the pistons in the cylinders and causes a pressure differential or suction which opens the ports 45 by causing the reeds 49 to move away from the respective side wall portions 41.

The reeds 49 are open during all stages of engine operation and the greater the pressure differential caused by the speed of the engine, the further the reeds 49 move away from the ports 45 until they stop against the stop member ribs 61. In other words, the amount of opening movement of the reeds 49 is dependent upon the pressure differential on the opposite sides thereof with the pressures including both static and dynamic pressures. When the reeds 49 are in a open or partially open position, the fuel-air mixture flows through the ports 45 and into the manifold intake passage 18 with portions of the fuel-air mixture also flowing through the slots 63 to assure uniformity of flow, and increase of turbulence and elimination of nonflowing or dead spots within the manifold 3. Because of the preferred converging relation of the side wall portions 41, the decreased flow area of the ports 45 and the configuration of the reeds 49, the velocity of the fuel-air mixture increases as it flows through the ports 45 of the housing walls 32 and through the intake manifold 3. The increase in velocity causes improved atomization and vaporization of the fuel in the air. Moreover, because the flow restriction imposed by the fuel air mixture regulator 1 creates a greater than normal vacuum in the intake manifold 3, fuel vaporization is improved. These improved atomization and vaporization characteristics create greater engine operating efficiency resulting in an increase of available power and a decrease in fuel consumption.

Under certain conditions of low speed idle the reeds 49 may not open a sufficient amount because of insufficient pressure differential to maintain the engine operation. In view of this, the small aperture 29 extended through the plate member 27 is provided creates a bleed flow passage permitting sufficient fuel and air to pass therethrough to maintain the engine operation.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. In a four-cycle, multiple cylinder internal combustion engine including intake valves for the respective cylinders and an intake manifold having walls defining passages respectively extending from individual cylinder intake ports to a central passage communicating with the outlet of a carburetor, a fuel-air mixture regulator therefor comprising:
   (a) a housing mounted between said carburetor and said manifold central passage, said housing having an inlet end communicating with said carburetor outlet and including walls extended into said central passage and spaced inwardly from said manifold walls;
   (b) a plurality of elongate ports in said walls; and
   (c) a plurality of thin, elongate resilient reeds having one end secured to said walls adjacent a respective port and extending in overlying relation to said port, said reeds respectively having free ends variably movable away from said ports in response to differential pressures to open said ports and permit fuel-air mixture to flow therethrough and through said intake manifold, said reeds variably opening said ports during engine operation with the opening being less with less differential pressure to provide higher velocity between the reeds and the ports for fuel-air mixture drawn through said carburetor and said housing directed to the intake manifold passages for flow to respective cylinders.

2. The fuel-air mixture regulator set forth in claim 1 wherein:
   (a) said walls are in opposed relation and converge remotely from said carburetor outlet; and
   (b) said reed free ends are remote from said carburetor outlet and said free ends extend in the direction of convergence of said walls.

3. The fuel-air mixture regulator set forth in claim 2 including:
   (a) a stop member secured to said walls extending in overlying relation to said reeds and limiting outward movement thereof during movement of same away from a respective port.

4. The fuel-air mixture regulator set forth in claim 3 wherein:
   (a) said reeds have the elongate length thereof extending away from said secured ends to said free ends in a direction generally away from said carburetor outlet.

5. The fuel-air mixture regulator set forth in claim 4 wherein:
   (a) said housing includes a plate member having marginal portions secured between complimentary flanges of said carburetor and said intake manifold.

6. The fuel-air mixture regulator set forth in claim 5 wherein:
   (a) said housing plate member has an aperture extended therethrough exteriorly from said housing walls, said aperture comprising a bleed flow passage for permitting sufficient quantities of fuel-air mixture to flow therethrough to maintain idle engine operation.

7. In a four-cycle multiple cylinder internal combustion engines having a carburetor and an intake manifold with a manifold intake passage communicating with a carburetor discharge passage for flow of fuel and air from the carburetor through the manifold to engine cylinders; a fuel-air mixture regulator comprising:
   (a) a regulator housing having a supporting member secured between the carburetor and intake manifold said regulator housing extending into the manifold intake passage and having walls defining a chamber therein in communication with said carburetor discharge passage, said walls including spaced side walls in angular relation converging and connected downstream from said support member;
   (b) a plurality of spaced ports in said side walls with seat surfaces around said ports exteriorly of said chamber, said ports being elongate with the major length extending in a direction from the support toward the manifold;
   (c) an elongate reed valve for each port having an end portion secured relative the respective side wall adjacent said support member with the reed valve overlying the respective port and biased against the respective seat, to normally close the respective port, said reed valves opening with free ends moving outwardly away from said seats for flow from the chamber to the manifold in response to differential pressure on the reed valves;
   (d) limiting plates secured relative to said housing side walls adjacent said support member and extending over said reed valves in outwardly spaced relation thereto and having end portions adjacent to and at a predetermined space from respective free ends of the reed valves to limit maximum port opening movement thereof;
   (e) said reed valve members opening members being in port closing position when the engine is stopped and in variable open positions during any engine operation in response to suction in the intake manifold with said reed valve and with the extent of the opening varying with the differential pressure acting on respective valves, the opening being less with less differential pressure to provide higher velocity through the ports of fuel and air drawn from the carburetor and the valve chamber to the intake manifold passage for flow to respective engine cylinders.

* * * * *